(12) United States Patent
Zingaretti et al.

(10) Patent No.: US 7,885,443 B2
(45) Date of Patent: Feb. 8, 2011

(54) FACILITATING TEMPORAL COMPARISON OF MEDICAL IMAGES

(75) Inventors: Gabriele Zingaretti, Santa Cruz, CA (US); Jimmy R. Roehrig, Aptos, CA (US); Julian Marshall, Los Altos, CA (US); Zhong Tao, Sunnyvale, CA (US)

(73) Assignee: Hologic, Inc., Marlborough, MA (US)

( * ) Notice: Subject to any disclaimer, the term of this patent is extended or adjusted under 35 U.S.C. 154(b) by 1088 days.

(21) Appl. No.: 11/600,246

(22) Filed: Nov. 14, 2006

(65) Prior Publication Data
US 2007/0122021 A1 May 31, 2007

Related U.S. Application Data

(60) Provisional application No. 60/736,510, filed on Nov. 14, 2005.

(51) Int. Cl.
*G06K 9/00* (2006.01)
(52) U.S. Cl. .................. 382/128; 382/131; 382/132
(58) Field of Classification Search .............. 382/128, 382/132, 298, 299
See application file for complete search history.

(56) References Cited

U.S. PATENT DOCUMENTS

| | | | |
|---|---|---|---|
| 6,630,937 B2 | 10/2003 | Kallergi et al. | |
| 6,654,445 B2 | 11/2003 | Shepherd et al. | |
| 7,046,860 B2 | 5/2006 | Soubelet et al. | |
| 7,054,473 B1 * | 5/2006 | Roehrig et al. | 382/128 |
| 7,133,066 B2 * | 11/2006 | Bourret | 348/180 |
| 2002/0193676 A1 | 12/2002 | Bodicker et al. | |
| 2003/0007598 A1 | 1/2003 | Wang et al. | |
| 2003/0071829 A1 | 4/2003 | Bodicker et al. | |
| 2003/0194115 A1 | 10/2003 | Kaufhold et al. | |
| 2004/0068167 A1 | 4/2004 | Hsieh et al. | |
| 2004/0100476 A1 | 5/2004 | Morita et al. | |
| 2004/0122704 A1 | 6/2004 | Sabol et al. | |
| 2004/0161164 A1 | 8/2004 | Dewaele | |

(Continued)

OTHER PUBLICATIONS

Alberdi, et al., "Ellicitation and Representation of Expert Knowlege for Computer Aided Diagnosis in Mammography," Methods Inf. Med. 2004; 43(3):239-46 (2004).
Hartswood, et. al., "Drawing the Line Between Perception and Interpretation in Computer-Aided Mammography," Proceedings of the First International Conference on Allocation of Functions., pp. 275--291, Galway, Ireland, IEA Press (October 1997).
Gohel, et al., "Workstation Interface for ROC Studies in Digital Mammography," Proc. SPIE vol. 3031, p. 440-447, Medical Imaging (1997).

*Primary Examiner*—Tom Y Lu
(74) *Attorney, Agent, or Firm*—Brian J. Daiuto

(57) ABSTRACT

Methods, systems, and computer program products for facilitating temporal comparison of medical images is provided, with one exemplary application being for breast mammograms. In one embodiment, prior and subsequent mammographic images of a breast acquired using at least partially different mammogram acquisition systems are displayed for simultaneous viewing on a same mammogram display at an identical tissue distance per unit display distance without requiring a scale-adjusting viewer input. Also described are other embodiments for optimally scaling, windowing and/or otherwise advantageously processing and/or displaying prior and subsequent mammographic image sets in manners that facilitate temporal comparison therebetween.

42 Claims, 9 Drawing Sheets

U.S. PATENT DOCUMENTS

| | | |
|---|---|---|
| 2004/0184644 A1 | 9/2004 | Leichter et al. |
| 2004/0252871 A1* | 12/2004 | Tecotzky et al. ............ 382/128 |
| 2005/0013471 A1* | 1/2005 | Snoeren et al. ............ 382/131 |
| 2005/0123185 A1 | 6/2005 | Balasubramanian et al. |
| 2005/0163360 A1* | 7/2005 | Snoeren et al. ............ 382/132 |
| 2006/0110022 A1 | 5/2006 | Zhang et al. |

* cited by examiner $H_T = K_{PRE}(H_{DW})$
$W_T > K_{PRE}(W_{DW})$
(ex: $K_{PRE} = 0.95$)

$W_T = K_{PRE}(W_{DW})$
$H_T < K_{PRE}(H_{DW})$

FACILITATING TEMPORAL COMPARISON OF MEDICAL IMAGES

CROSS-REFERENCE TO RELATED APPLICATIONS

This application claims the benefit of U.S. Provisional Application No. 60/736,510, filed Nov. 14, 2005, which is incorporated by reference herein.

FIELD

This patent specification relates to medical imaging. More particularly, this patent specification relates to the processing and display of medical images of a body part acquired at different times using image acquisition equipment of different types and/or settings.

BACKGROUND

Progress toward all-digital medical imaging environments has substantially increased the speed at which large amounts of medical image information can be accessed and displayed to a radiologist. As used herein, radiologist generically refers to a medical professional that analyzes medical images and makes clinical determinations therefrom, it being understood that such person might be titled differently, or might have differing qualifications, depending on the country or locality of their particular medical environment.

One example of the increasing amount of information available to the radiologist relates to the temporal comparison of mammographic images, wherein years of prior mammographic images may be available for viewing in conjunction with a current-year mammographic image. However, as discussed in the commonly-assigned U.S. Ser. No. 11/173,960, entitled "Displaying and Navigating Computer-Aided Detection Results on a Review Workstation," which is incorporated by reference herein, problems can arise at the interface between (a) the amount of information available to a radiologist, and (b) the amount of information that can be usefully perceived by the radiologist in a reasonable amount of time. These issues are especially important in today's radiology environment, where there is an ongoing tension between providing high-quality detection/diagnosis for each patient and maintaining adequate patient throughput to keep costs under control. Even the differences between a few hand movements, keystrokes, or mouse cursor movements can lead to substantial changes in radiologist efficiency, stamina, and/or accuracy, which can save lives.

The term computer-aided detection (CAD) is commonly used to refer to the use of computers to analyze medical images to detect anatomical abnormalities therein, and/or the use of computers to otherwise process image information in a manner that facilitates perception of the medical image information by a radiologist. Sometimes used interchangeably with the term computer-aided detection are the terms computer-aided diagnosis, computer-assisted diagnosis, or computer-assisted detection. In an abnormality detection context, a CAD algorithm usually identifies a preliminary set of candidate detections in a medical image and then selects which ones, if any, will qualify as actual CAD detections based on a variety of computed features associated with the candidate detections. The CAD results, i.e., the body of information associated with the operation of the CAD algorithm on the medical image, are most often communicated in the form of annotation maps comprising graphical annotations (CAD markers) overlaid on a diagnostic-quality or reduced-resolution version of the medical image, one CAD marker for each CAD detection. Substantial effort and attention has been directed to increasing the analysis capabilities of CAD systems, resulting in ever-increasing amounts of information that is available to the radiologist for review.

For the important context of temporal comparison, at least one of the preferred embodiments herein is not necessarily directed to providing more CAD-generated information to the radiologist, but rather to providing better presentation of medical image information that already needs to be presented to the radiologist. As known in the art, there are often many different commercial image acquisition and display systems available for use. Examples for the digital mammography field include Senographe 2000D (General Electric), Senoscan (Fischer), Selenia (Lorad, a Hologic Company), Microdose (Sectra), FCR Profect (Fuji), CR 85.0 (Agfa), CR 850/950 (Kodak), Regius 190 (Konica), and Novation (Siemens). Generally speaking, the various image acquisition and display systems can have significantly different detector sizes, detector spatial resolutions, and detector characteristic response curves, as well as different display monitor types and display enhancement algorithms. Also, there are many different analog (film-based) mammography systems in use, and many different types of digitizers available for scanning the resultant film images into digital format for processing, display, and/or archiving.

It can often be the case that a prior year mammogram was obtained using a first type of image acquisition and display system and a subsequent year mammogram was obtained using a second type of image acquisition and display system, whereas the prior and subsequent year mammograms are being presented side-by-side for temporal comparison on only one of the first or second display systems, or on an altogether different third display system. Problems can arise in this side-by-side display that can adversely affect the radiologist experience, such as a need to repeatedly shift, re-window, or re-size the images, a need to repeatedly change brightness/contrast settings, etc., so that the prior and subsequent-year mammograms can be properly viewed for comparison. This can bring about reduced radiologist efficiency, increased irritation or fatigue, or even missed detections or incorrect diagnoses resulting from the different size, scale, windowing, or otherwise different look of the side-by-side images not sufficiently corrected or correctable by the radiologist. It would be desirable to provide for processing of the prior and/or subsequent year medical images for side-by-side comparison in a manner that at least partially resolves one or more of the above issues.

Although the preferred embodiments described herein are particularly advantageous in an x-ray mammography environment and are presented in such context, it is to be appreciated that the features and advantages of the preferred embodiments can also be applied in other medical imaging contexts including, but not limited to, ultrasound, x-ray tomosynthesis, CT, MRI, PET, SPECT, thermography, electrical conductivity-based modalities, and other modalities for a variety of different body parts (e.g., head, neck, chest, abdomen, etc.). Other issues arise as would be apparent to one skilled in the art upon reading the present disclosure.

SUMMARY

In one embodiment, a method for facilitating temporal comparison of breast mammograms by a viewer is provided. A prior mammographic image originating from a first mammogram acquisition system and having a first tissue distance per pixel is received, and a subsequent mammographic image of the breast originating from a second mammogram acquisition system is received. The second mammogram acquisition system is different than the first mammogram acquisition system and has a second tissue distance per pixel different than the first tissue distance per pixel. Without requiring a scale-adjusting viewer input, the prior and subsequent mammographic images are displayed for simultaneous viewing on a same mammogram display at an identical tissue distance per unit display distance.

Also provided is a computer program product stored on a tangible medium for facilitating temporal comparison of breast mammograms by a viewer. The computer program product comprises computer code for receiving a first mammographic image of a breast originating from a first mammogram acquisition system and a temporally distinct second mammographic image of the breast originating from a second mammogram acquisition system different than the first mammogram acquisition system with respect to at least one of system manufacturer, detector type, detector size, and detector resolution. The computer program product further comprises computer code for segmenting each of the first and second mammographic images to identify a background section and a breast tissue section thereof. The computer program product still further comprises computer code for simultaneously displaying, without requiring a scale-adjusting or a window-adjusting viewer input, the first and second mammographic images at a same absolute spatial scale in commonly sized, substantially adjacent display windows on a mammogram display. Preferably, this "universal" absolute spatial scale for the entire temporal comparison display is a value for which (i) the breast tissue section of one of the mammographic images extends across a predetermined high percentage, such as 95%, of its display window in one of a heightwise and widthwise dimension, and extends across less than that predetermined high percentage in the other of the heightwise and widthwise dimensions, while also being the value for which the breast tissue section of the other mammographic image extends across less than the predetermined high percentage for both the heightwise and widthwise dimensions.

Also provided is a method for facilitating temporal comparison of digitally acquired breast mammograms by a viewer. The method comprises receiving, in a raw format, a prior mammographic image originating from a first digital mammogram acquisition system, and receiving a subsequent mammographic image of the breast originating from a second digital mammogram acquisition system different than the first digital mammogram acquisition system with respect to at least one of system manufacturer, detector characteristic, and display enhancement algorithm. If the first and second digital mammogram acquisition systems differ with respect to the detector characteristic, the pixel values of the raw-format prior mammographic image are remapped to estimate pixel values that would have resulted from acquiring the raw-format prior mammographic image from the second digital mammogram acquisition system. The method further comprises display-enhancing the raw-format prior mammographic image, which has been remapped if needed, according to one of an actual display enhancement algorithm and emulative display enhancement algorithm associated with the second digital mammogram acquisition system. Finally, the method further comprises displaying for simultaneous viewing the display enhanced remapped or non-remapped raw-format prior mammographic image and a display-enhanced version of the subsequent mammographic image processed according to the actual enhancement algorithm associated with the second digital acquisition system. Comparison between the prior and subsequent mammographic images is facilitated because, to an appealingly precise degree, both the prior and subsequent mammograms appear as if they were both acquired using the second mammogram acquisition system associated with the subsequent mammogram acquisition procedure.

Also provided is a method for facilitating temporal comparison of digitally acquired breast mammograms by a viewer in which both the prior and subsequent mammograms appear as if they were both acquired using the first mammogram acquisition system associated with the prior mammogram acquisition procedure. More particularly, a raw format version of the subsequent mammographic image of the breast originating from the second digital mammogram acquisition system is received and if the first and second digital mammogram acquisition systems differ with respect to the detector characteristic, the pixel values of the raw-format subsequent mammographic image are remapped to estimate pixel values that would have resulted from acquiring the raw-format subsequent mammographic image using the first digital mammogram acquisition system. The method further comprises display-enhancing the remapped or non-remapped raw-format subsequent mammographic image according to one of an actual display enhancement algorithm and emulative display enhancement algorithm associated with the first digital mammogram acquisition system. Finally, the method further comprises displaying for simultaneous viewing the display enhanced remapped or non-remapped raw-format subsequent mammographic image and a display-enhanced version of the prior mammographic image. For one preferred embodiment, the viewer is provided a choice as to whether both of the mammograms appear to have been from the first mammogram acquisition system or whether both appear to have been from the second mammogram acquisition system.

DETAILED DESCRIPTION

Figure 1:
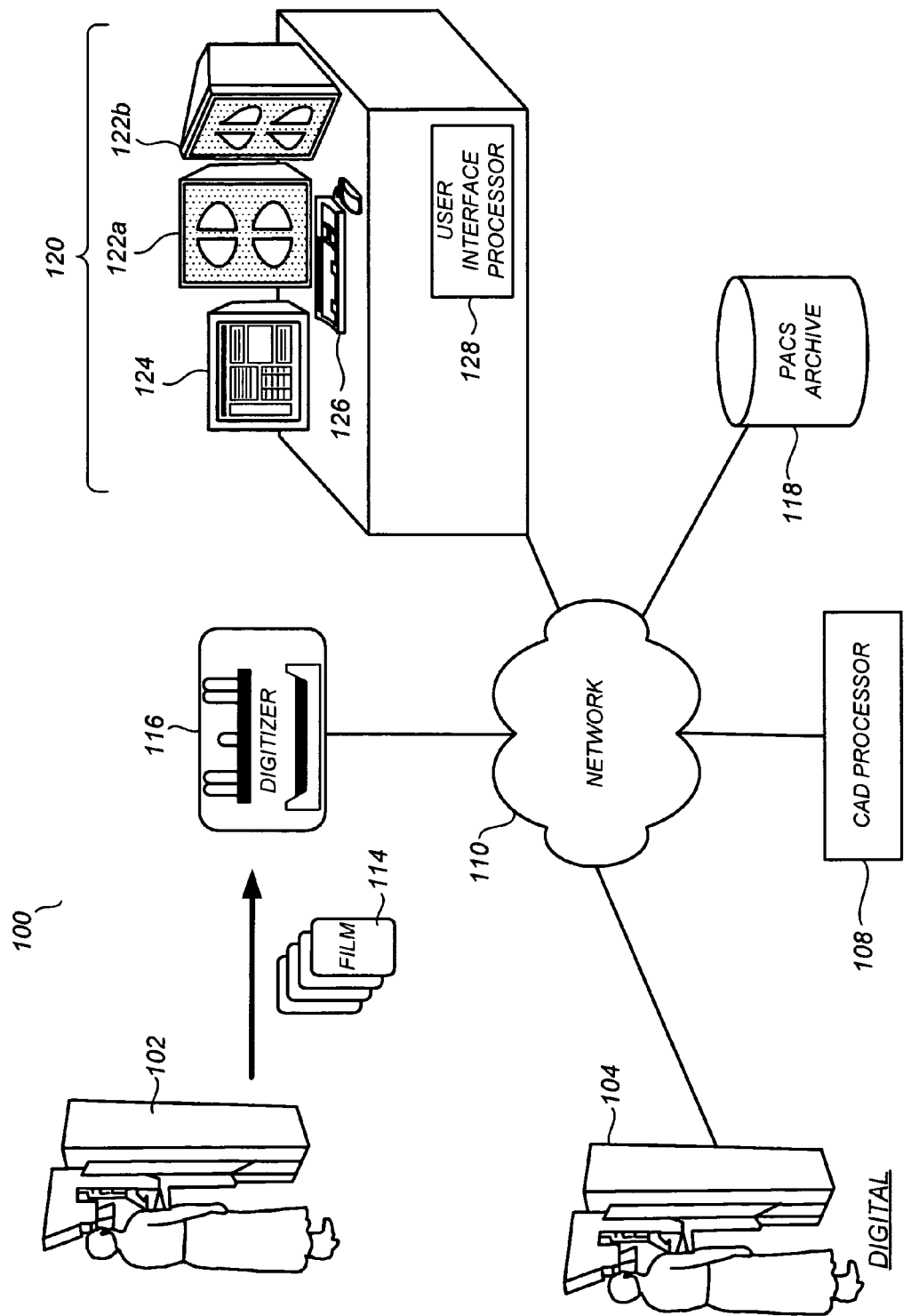
FIG. 1 illustrates a conceptual diagram of a medical imaging environment in which one or more of the preferred embodiments is applicable.

FIG. 1 illustrates a conceptual diagram of a medical imaging environment for which one or more of the preferred embodiments is particularly suited. Shown in FIG. 1 is a network 110, which may be a HIS/RIS (Hospital Information System/Radiology Information System) network, to which is coupled a film mammogram acquisition device 102, and a digital mammogram acquisition device 104. The film mammogram acquisition device 102 and digital mammogram acquisition device 104 are representative of a particular example of technology evolution that is/will be generally occurring in practical radiology environments, in which film-based mammogram systems are being phased out in favor of digital mammogram systems. Other situations to which the preferred embodiments described herein are particularly advantageous include, by way of nonlimiting example, (i) a scenario in which a patient visits a first mammography clinic in a first year that possesses a first mammogram acquisition system (film or digital) and visits a second mammography clinic in a second year that possesses a different second mammogram acquisition system (film or digital), (ii) a scenario in which the clinic and a type/manufacturer of digital mammography equipment stay the same across years for a particular patient but the detector and/or display enhancement algorithms are updated between years, and (iii) a scenario in which the clinic and a type/manufacturer of digital mammography equipment stay the same and a different detector paddle is used.

The film mammograms are commonly sized or 18×24 cm or 24×30 cm, and are digitized by a digitizer 116 having a resolution between about 25 μm to 100 μm per pixel depending on type and/or settings. By way of example, a DigitalNow™ digitizer system available from R2 Technology (A Hologic Company) of Santa Clara, Calif. currently digitizes at 50 μm per pixel resolution. The digital acquisition system 104 can be one of many different commercially available systems named above, each of which often has its own unique digital detector sizes and resolutions. For example, the GE Senographe may use a 23×31 cm detector size or a 19×23 cm detector size, each having detector pixel resolutions of 100 μm. A Hologic Selenia or Siemens Novation system may use a 23 cm×29 cm detector size with a 70 μm per pixel resolution. A Fischer Senoscan may use a 21×29 cm detector having a 25 μm or or 50 μm resolution.

A CAD processor 108 coupled to the network 110 receives digital versions of the digital or digitized mammograms and processes them to detect anatomical abnormalities therein. The medical images are then viewed at a softcopy review workstation 120 that offers CAD-assisted viewing. Also coupled to the network 110 is a PACS (Picture Archiving and Communication System) archive 118, generally representing a repository for medical information associated with the medical imaging environment, including both current and archived images, current and archived CAD results, radiology reports for completed cases, and so forth. Preferably, the various medical images and related information are communicated according to the DICOM (Digital Imaging and Communications in Medicine) standard and the network 110 supports the TCP/IP protocol, which is used as the transport protocol for the DICOM standard.

In one preferred embodiment, the review workstation 120 comprises a multi-modality workstation adapted and configured for a mammography environment. In one example, a Sectra IDS5/mx.net dedicated mammography workstation can be used that allows for third-party plug-ins, including plug-ins providing the scaling and user interfacing functionalities described herein. Review workstation 120 comprises diagnostic monitors 122a and 122b, an administrative monitor 124, user input devices 126 (e.g., keyboard, mouse, trackball, pointers, etc), and a user interface processor 128. Administrative monitor 124 is used for input and output of a wide variety of information that may be associated with a particular set of medical images (e.g., listings, tables, plots, text descriptions, etc), as well as for system installation, maintenance, updating, and related tasks. Generally speaking, the administrative monitor 124 can be a relatively low-cost monitor as would be found in generic information processing environments. However, the diagnostic monitors 122a-122b should be FDA-approved as having sufficient luminance, contrast, resolution, and other characteristics that qualify them as proper medical image screening and/or diagnosis tools. By way of example and not by way of limitation, typical characteristics of such diagnostic monitors would currently include: a resolution of 2048×2560 (5 megapixels) at a diagonal size of 21.3 inches (54 cm), a height of 16.6 inches (42.2 cm), and a width of 13.3 inches (33.7 cm); a brightness of 700 cd/m$^2$; and a dynamic range of 3061 different shades of gray.

For one preferred embodiment, the review workstation 120 and CAD processor 108 correspond to a Sectra IDS5/mx.net breast imaging workstation and an R2 Imagechecker D Mammography CAD system, respectively, corresponding to a Citra™ Mammography Applications Suite available from R2 Technology (A Hologic Company) of Santa Clara, Calif. In one embodiment, the data retrieval, processing, and display described further hereinbelow is performed by computer code operating on the CAD processor 108 such as the R2 ImageChecker D Mammography CAD system, which thereby facilitates a CAD-enablement or CAD-enhancement of the mammography review workflow. Advantageously, the CAD processor 108 performs, as part of its abnormality detection algorithm, the breast segmentation algorithms (i.e., identification of background, skinline, and breast tissue) using known methods, and therefore that information is readily available for display scale optimization purposes as well.

Notably, the medical imaging environment of FIG. 1 is presented by way of example only and is not intended to limit the scope of the preferred embodiments to this particular scenario. By way of example, different combinations of the devices of FIG. 1 can be placed adjacently to each other or integrated into the same hardware boxes without departing from the scope of the preferred embodiments. By way of still further example, the network 110 can be a wide-area network with the different nodes being distributed throughout a city, a country, or the world. Alternatively, and by way of still further example, some or all of the transfer of digital information can be achieved by physical transfer of disks, memory sticks, or other digital media devices without departing from the scope of the preferred embodiments. Notably, the processing for display scale optimization and layout described herein, or other processing described herein, can be performed by hardware other than the CAD system 108 (e.g., by user interface processor 128 or as plug-ins to various commercially available medical image review systems) without departing from the scope of the preferred embodiments. In view of the present disclosure, a person skilled in the art would be able to construct such plug-ins or other software packages capable of achieving the described user interfaces and processing functionalities without undue experimentation, using publicly available programming tools and software development platforms.

Figure 2:
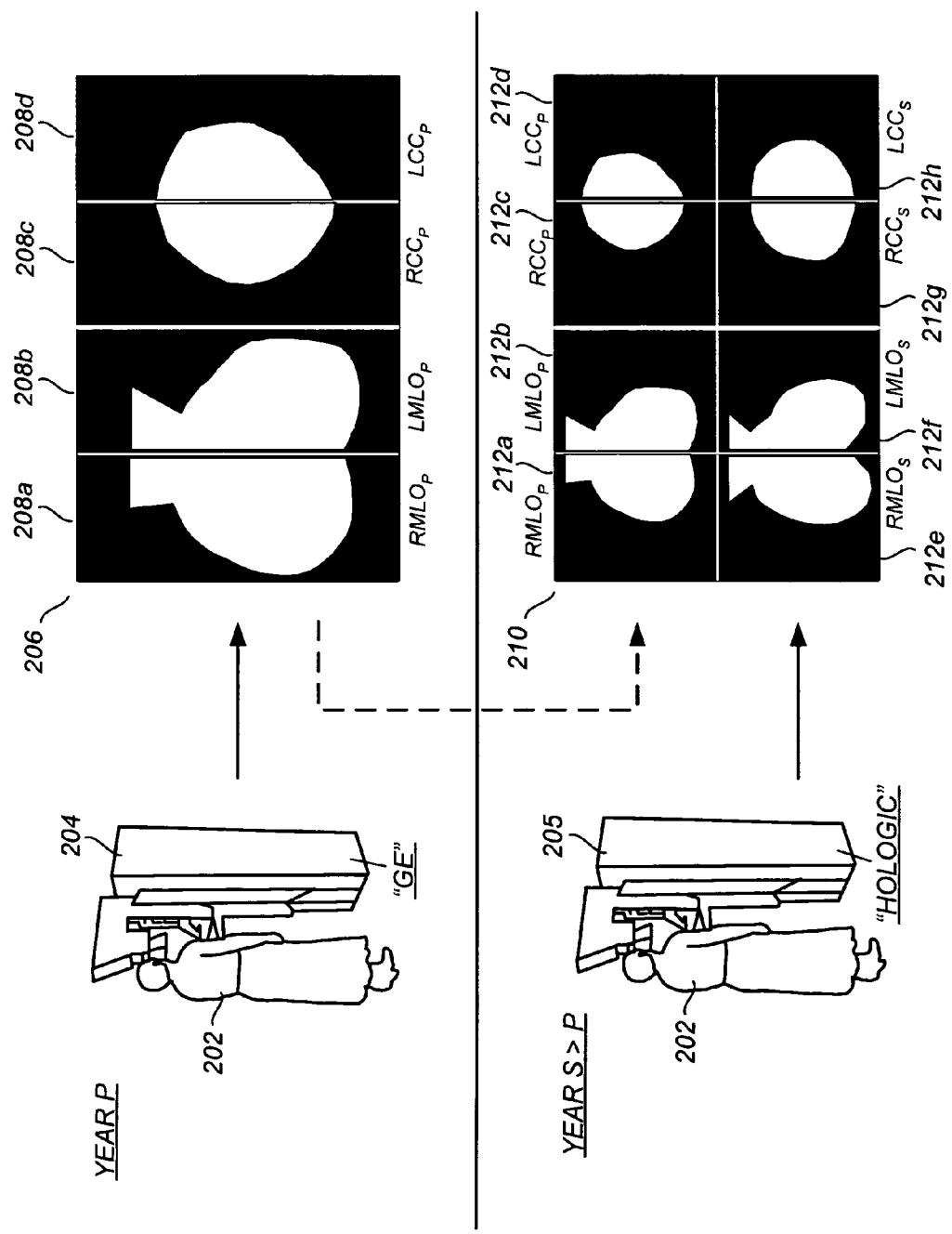
FIG. 2 illustrates a conceptual diagram of acquiring prior year and subsequent year mammograms on different mammography acquisition systems, a 4-up single mammogram case display viewed during the prior year, and a subsequent 8-up mammogram display facilitating temporal comparison according to a preferred embodiment during the subsequent year.

FIG. 2 illustrates a conceptual diagram of acquiring prior year and subsequent year mammograms of a patient 202 on different mammography acquisition systems 204 and 205, a 4-up single mammogram case display 206 viewed during the prior year, and a subsequent 8-up mammogram display 210 facilitating temporal comparison according to a preferred embodiment during the subsequent year. The subscripts "P" and "S" are used to denote prior and subsequent. The mammogram displays 206 and 210, within which are positioned display windows 208*a-d* and 212*a-h*, respectively as shown, can be provided on a single monitor or be spread across multiple adjacent monitors without departing from the scope of the preferred embodiments. According to a preferred embodiment, as reflected by the displays 206 in FIG. 2 (and, separately, as shown in the display 210), it is the case that all of the mammogram views are displayed at an identical absolute spatial resolution (i.e., the same distance of breast tissue per unit display distance or, equivalently, the same distance of breast tissue per monitor pixel (where all the monitors are identical if there are multiple monitors)). Even more preferably, as reflected by the displays 206 in FIG. 2 (and, separately, as shown in the display 210), it is the case that (i) a relatively large percentage of at least one of the display windows associated with said subsequent mammogram image set is occupied by the breast tissue section of the corresponding mammogram view (see window 208*a* of display 206, and window 212*e* of display 210), and (ii) the breast tissue sections of each of the simultaneously displayed mammogram views for said subsequent mammogram image set are wholly contained in their respective display windows.

Still more preferably, as reflected by the displays 206 in FIG. 2 (and, separately, as shown in the display 210), it is the case that both (i) the breast tissue section of one of the mammogram views associated with the subsequent mammogram image set extends across a predetermined high percentage of its display window in one of a heightwise and widthwise dimension and extends across less than the predetermined high percentage in the other of the heightwise and widthwise dimensions (see window 208*a* of display 206, and window 212*e* of display 210), and (ii) the breast tissue sections of each of the other mammogram views associated with the subsequent mammogram image set extends across less than the predetermined high percentage for both the heightwise and widthwise dimensions (see all the other display windows of displays 206 and 210).

Figures 3, 4:
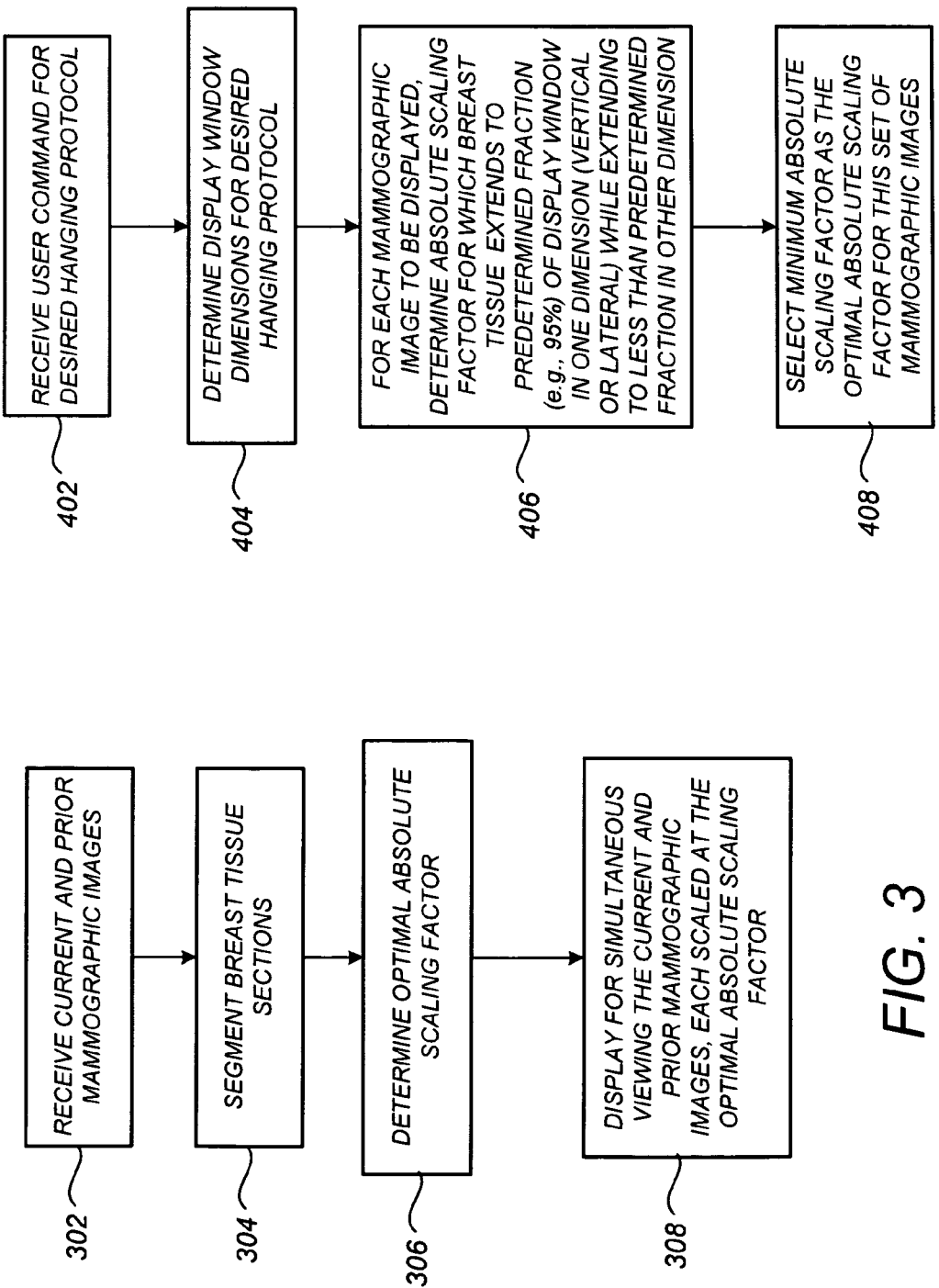
FIG. 3 illustrates a method for facilitating temporal comparison of medical images according to a preferred embodiment.
FIG. 4 illustrates a method for determining an optimal absolute scaling factor for a mammographic temporal comparison display according to a preferred embodiment.

FIG. 3 illustrates a method for facilitating temporal comparison of medical images according to a preferred embodiment. At step 302, the current and prior mammographic images are received. At step 304, the breast tissue, skinline, and background is segmented using known methods. At step 306, an optimal absolute scaling factor (tissue distance per unit display distance, or equivalent metrics such as tissue distance per display pixel) is determined. At step 308, all of the mammogram views of both of the prior and subsequent mammogram image sets are displayed at that optimal absolute scaling factor.

FIG. 4 illustrates a method for determining an optimal absolute scaling factor for a mammographic temporal comparison display according to a preferred embodiment. At step 402, the type of desired using hanging protocol is identified, which allows at step 404 the determination of the display window dimensions. At step 406, for each mammographic image to be displayed, an absolute scaling factor for that particular image is determined for which the breast tissue extends to a predetermined fraction, such as 95%, of the display window in one dimension (heightwise or widthwise) while extending to less than the predetermined fraction in the other dimension. At step 408, the minimum result from step 407 is selected as the optimal absolute scaling factor across the simultaneously displayed image set, which causes all of the breast tissue of all of the images to appear in the display windows (or, more particularly, within the 95% or other predetermined fraction thereof), while showing them at a largest scale for which that is the case. It has been found that 95% or other factor less than 100% is desirable so that the nipple can be properly viewed.

Figure 5B:
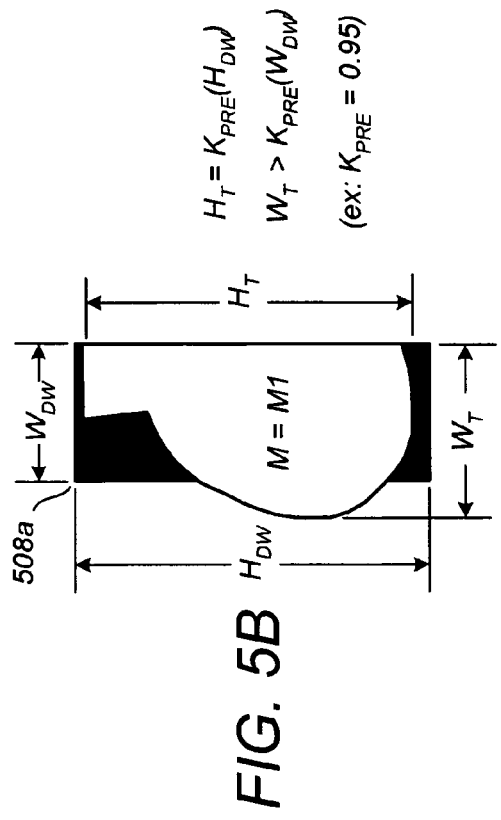
FIG. 5B illustrates a single mammogram view sized relative to a display window such that the breast tissue section extends across a predetermined high percentage of the display window in a heightwise dimension but extends across more than that predetermined high percentage in the widthwise dimension.
Figure 5C:
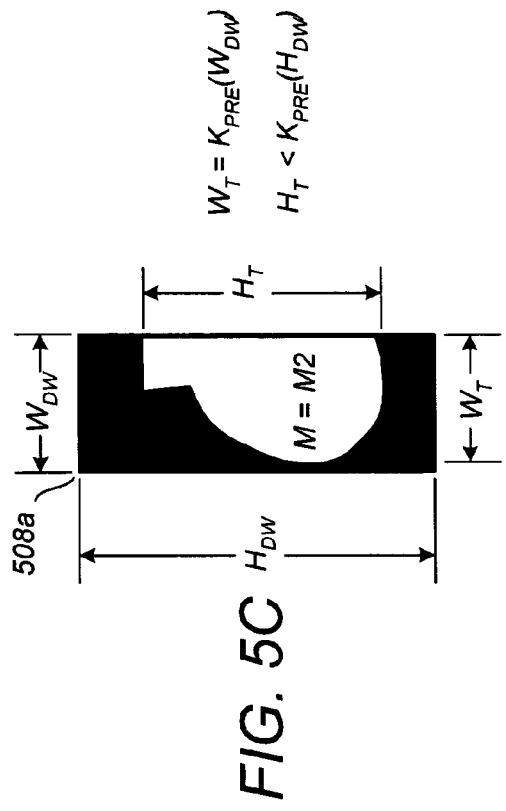
FIG. 5C illustrates the single mammogram view of FIG. 5B sized relative to the display window such that the breast tissue section extends across a predetermined high percentage of the display window in the widthwise dimension and extending across less than that predetermined high percentage in the heightwise dimension.
Figure 5A:
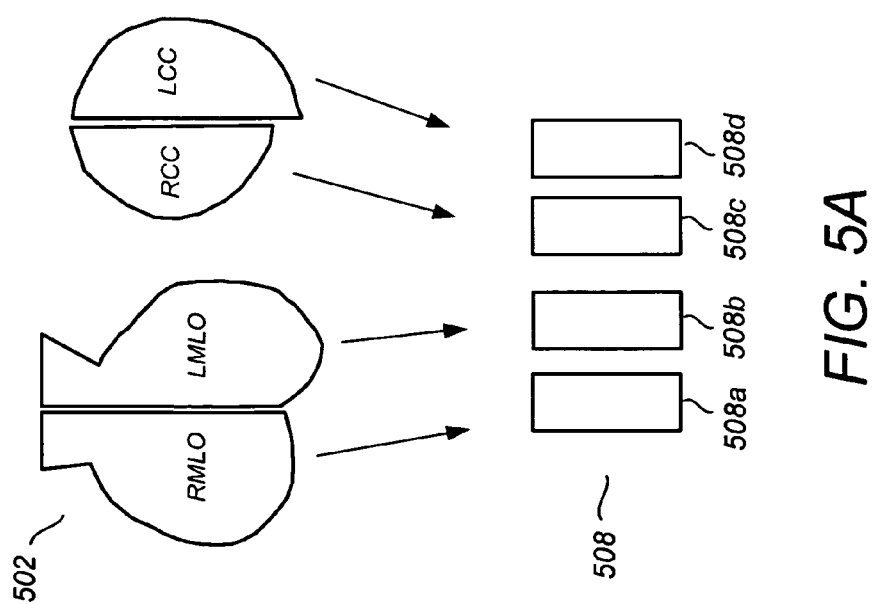
FIG. 5A illustrates a conceptual visual example of a mammogram set scaling issue resolved according to one or more of the preferred embodiments.
Figure 6:
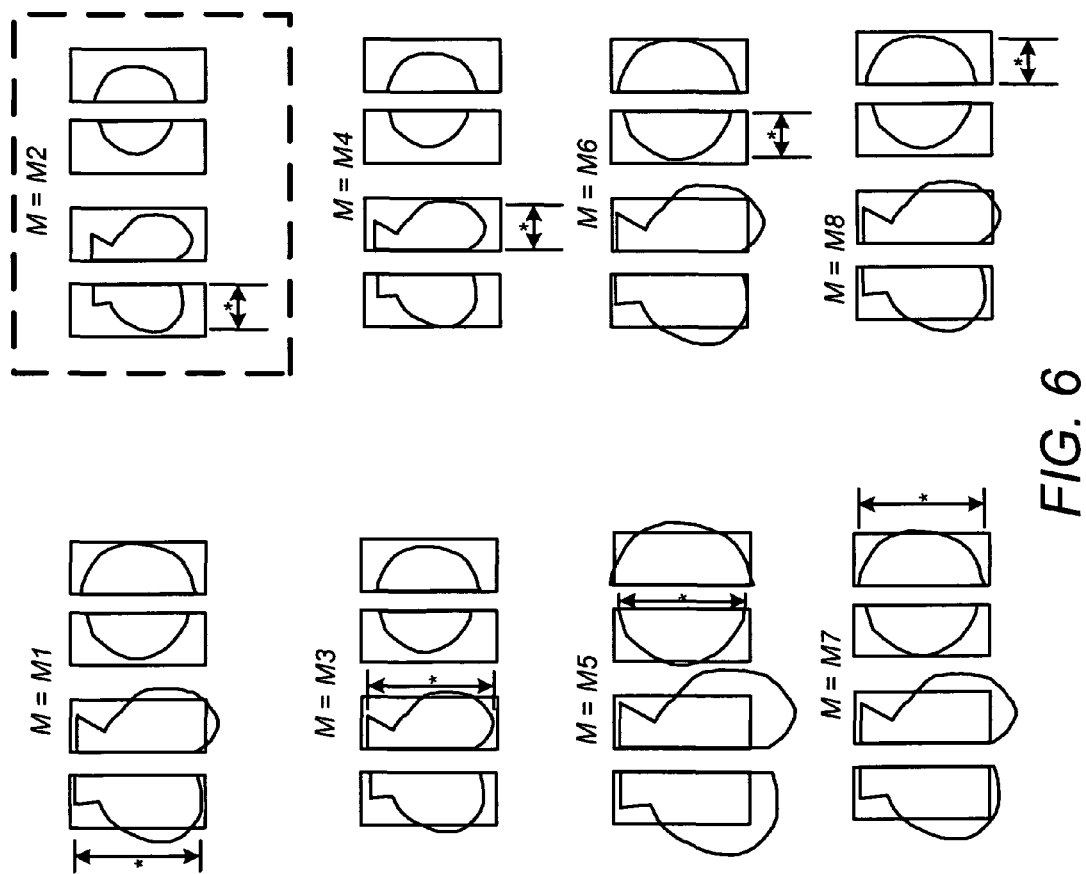
FIG. 6 illustrates the mammogram set scaling issue of FIG. 5 as would be the result of computing an absolute scaling criterion based on respective ones of the mammogram views occupying a predetermined percentage heightwise and lengthwise, respectively, including a highlighting of the result of an optimal absolute scaling factor according to a preferred embodiment.

The features and advantages of the preferred scaling algorithm can be understood with respect to FIGS. 5A-5C and FIG. 6. FIG. 5A illustrates a conceptual visual example of a mammogram set scaling issue resolved according to one or more of the preferred embodiments. FIG. 5B illustrates a single mammogram view sized relative to a display window such that the breast tissue section extends across a predetermined high percentage of the display window in a heightwise dimension but extends across more than that predetermined high percentage in the widthwise dimension. FIG. 5C illustrates the single mammogram view of FIG. 5B sized relative to the display window such that the breast tissue section extends across a predetermined high percentage of the display window in the widthwise dimension and extends across less than that predetermined high percentage in the heightwise dimension. FIG. 6 illustrates the mammogram set scaling issue of FIG. 5 as would be the result of computing an absolute scaling criterion based on respective ones of the mammogram views occupying a predetermined percentage heightwise and lengthwise, respectively, including a highlighting of the result of the optimal absolute scaling factor according to a preferred embodiment. The optimal result of FIG. 6, which is shown for a single-year 4-up case, is readily extended to the dual-year 8-up case, as shown in FIG. 2, supra at display 210.

Figure 7:
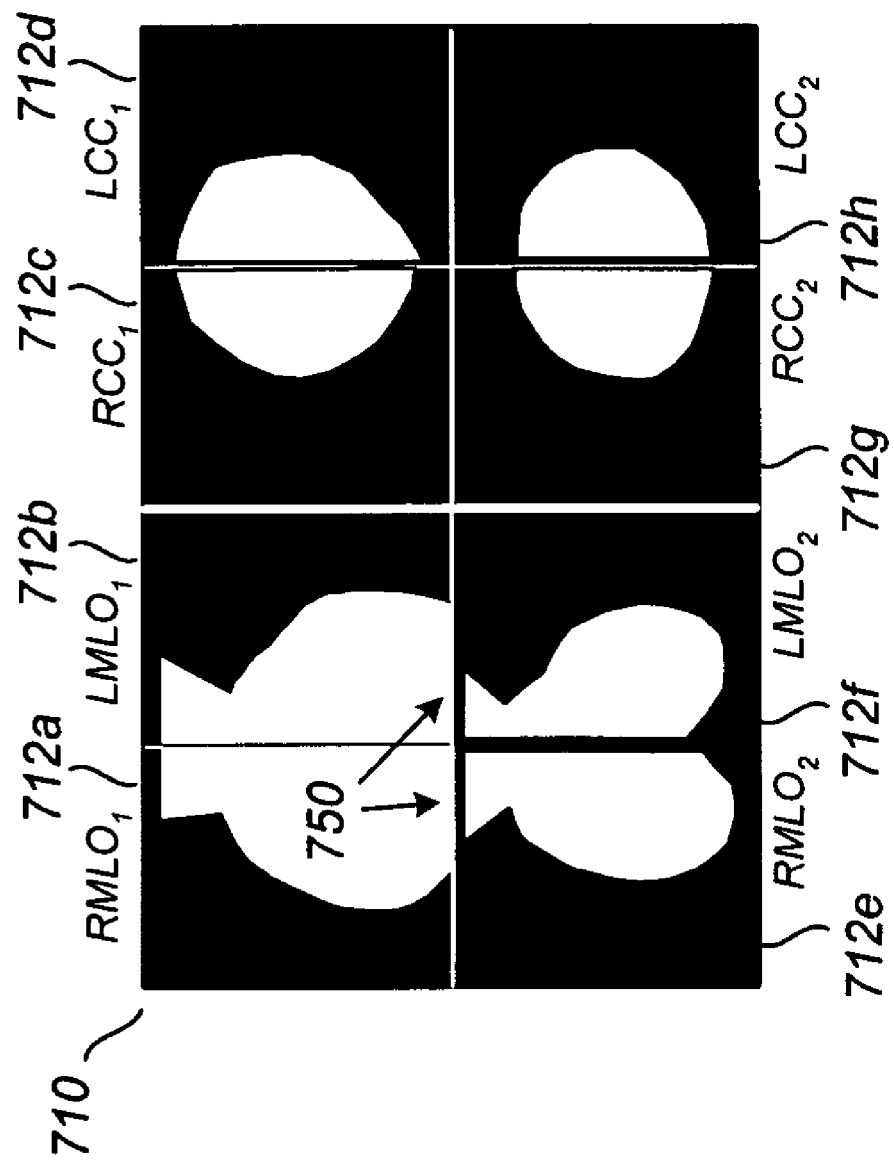
FIG. 7 illustrates one outcome of an 8-up display for comparing prior and subsequent year mammograms having an absolute scaling factor determined only according to the subsequent year mammogram set according to a preferred embodiment.

FIG. 7 illustrates one outcome of an 8-up display for comparing prior and subsequent year mammograms having an absolute scaling factor determined only according to the subsequent year mammogram set according to a preferred embodiment. That is, instead of applying the algorithm of FIGS. 3-4 across all images for the prior and subsequent year, it is only performed for the current year, and then both the current and prior years are shown at that optimal absolute spatial scale, even if the prior year mammograms (see FIG. 7 at 750) are partially truncated in the display. This is a useful result because it is indeed the current year images that are more immediately important to the radiologist.

Figure 8B:
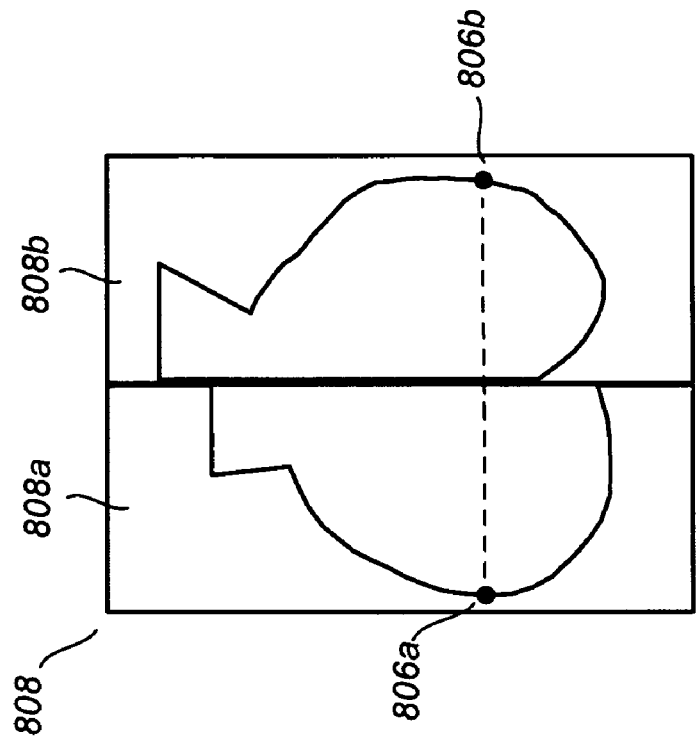
FIGS. 8A-8B illustrate vertical placement of a left-right mammogram view pairs using fiducial marker locations identified thereon according to a preferred embodiment, wherein the fiducial marker is selected to be a nipple location.
Figure 8A:
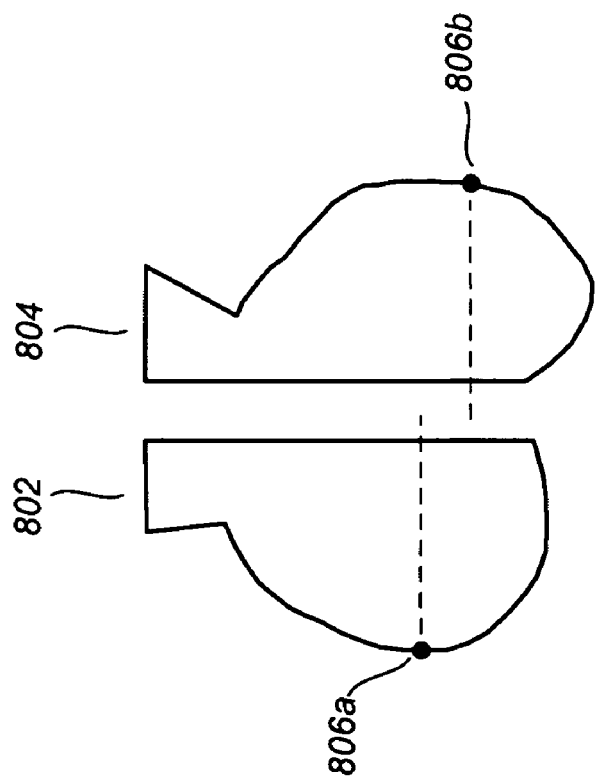

FIGS. 8A-8B illustrate vertical placement of a left-right mammogram view pairs using fiducial marker locations identified thereon according to a preferred embodiment, wherein the fiducial marker is selected to be a nipple location. According to a preferred embodiment, the segmented breast tissue of one of the left or right images appears vertically centered within its window (the RCC in window 808*a* for this case), and then the breast tissue of the other is vertically translated until the fiducial marker locations are aligned. Other suitable fiducial marker locations include, for example, a breast tissue centroid location, and a halfway point between an uppermost and lowermost point of the segmented breast tissue.

Figure 9:
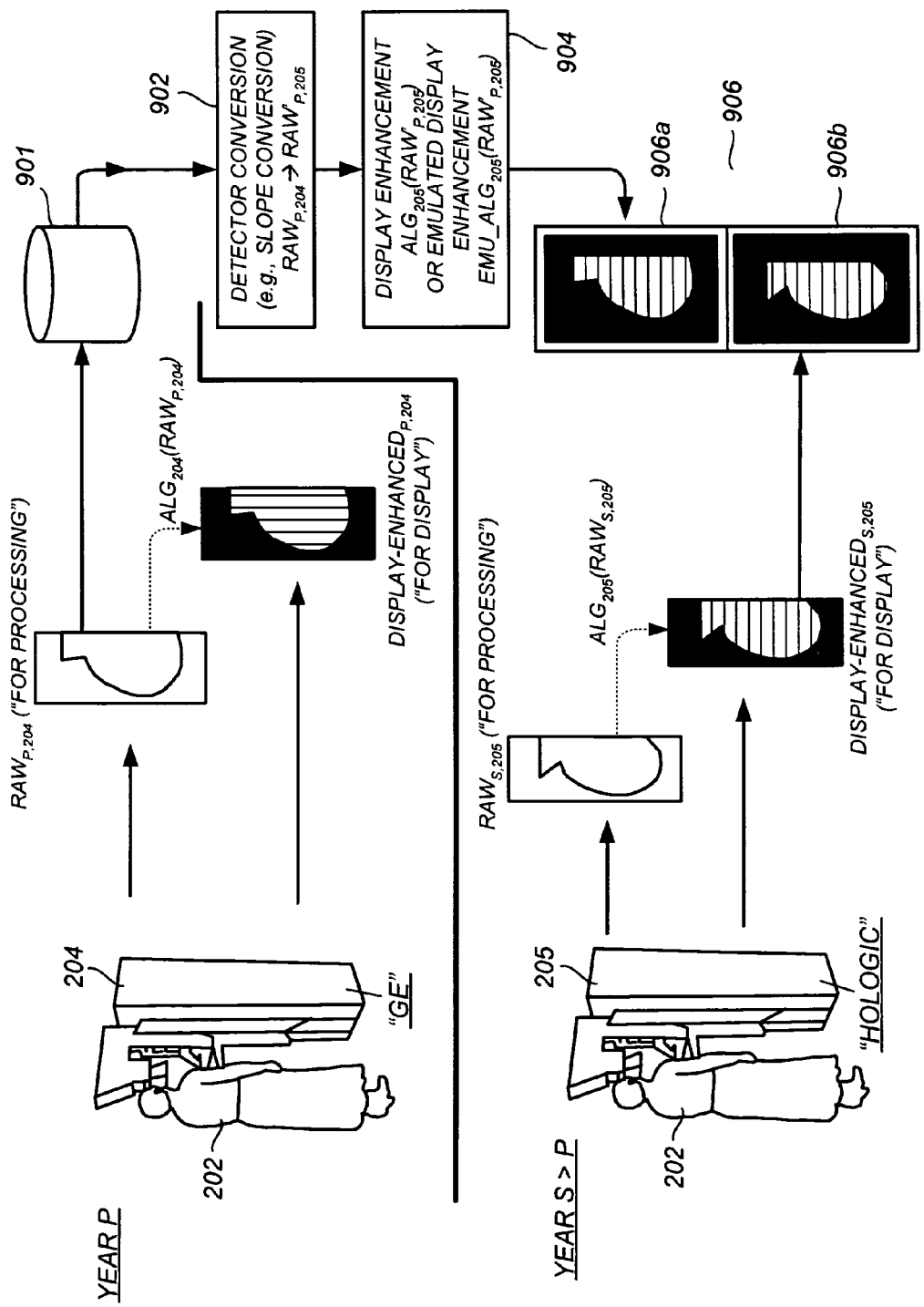
FIGS. 9-10 each illustrate a conceptual acquisition, storage, processing, and display flow for facilitating temporal comparison of mammographic image cases acquired using different digital mammographic acquisition systems according to a preferred embodiment.
Figure 10:
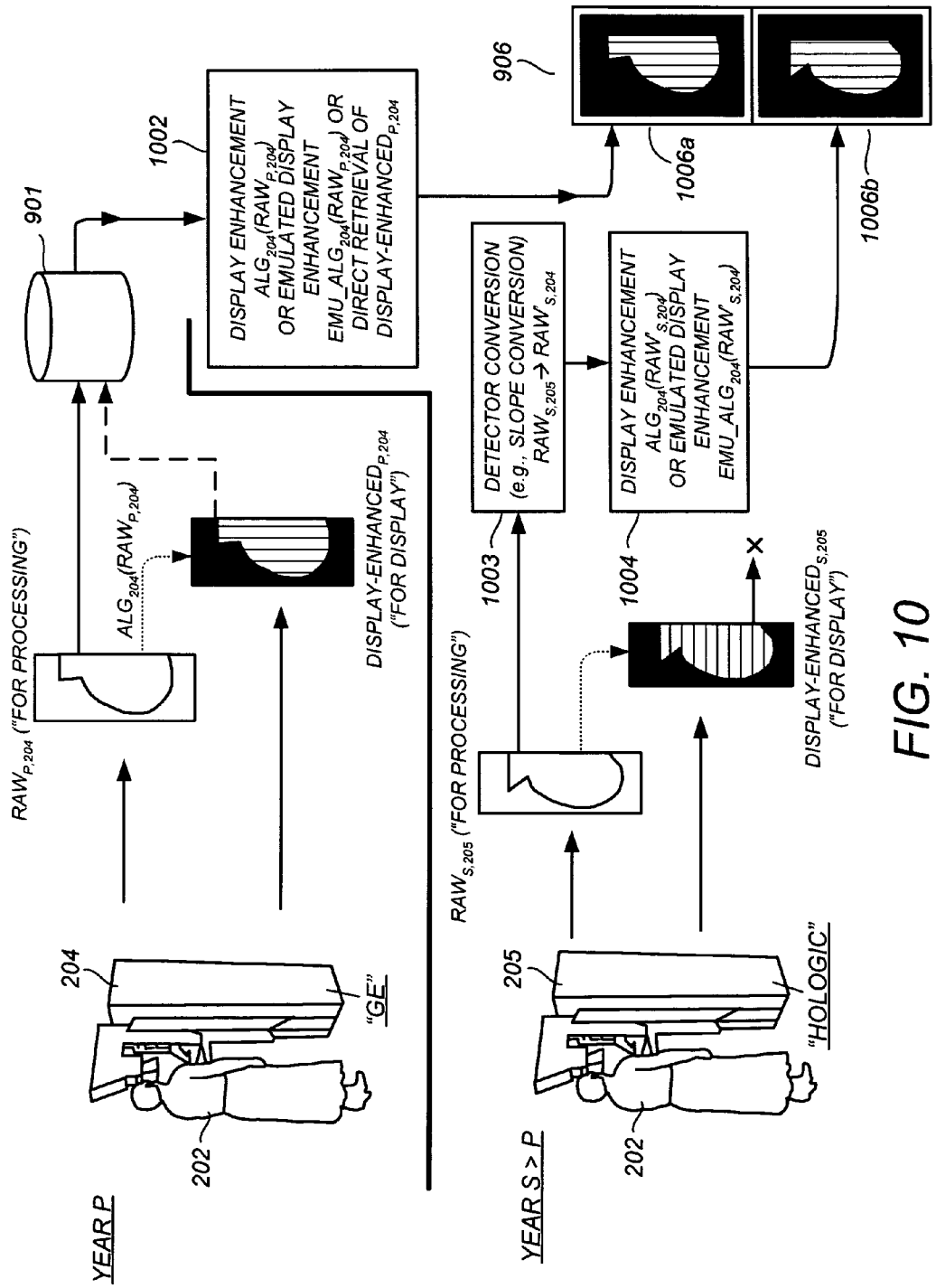

FIGS. 9-10 each illustrate a conceptual acquisition, storage, processing, and display flow for facilitating temporal comparison of mammographic image cases acquired using different digital mammographic acquisition systems according to a preferred embodiment. As known in the art, most commercially sold digital acquisition systems provide a raw or "for processing" image, having a linear characteristic curve (e.g., pixel value versus log exposure) at a slope usually specific to its detector, and a display-enhanced or "for display" mammogram that is a processed version of the raw image optimized for display. One or both of the raw and display-enhanced versions is usually archived for future temporal comparisons. For each of the embodiments of FIGS. 9-10, spatial scaling adjustments are also applied as necessary and/or as described hereinabove.

With reference to FIG. 9, a method for facilitating temporal comparison of digitally acquired breast mammograms by a viewer is provided. A prior mammographic image $RAW_{P,204}$ originating from a first digital mammogram acquisition system 204 is received in a raw format. A subsequent mammographic image is received (DISPLAY-ENHANCED$_{S,205}$) of the breast originating from a second digital mammogram acquisition system 205 different than the first digital mammogram acquisition system with respect to at least one of system manufacturer, detector characteristic (e.g., slope of the characteristic "curve" of the detector, which is actually a characteristic "line" for most detectors), and display enhancement algorithm ($ALG_{204}$ versus $ALG_{205}$). If the first and second digital mammogram acquisition systems indeed differ with respect to the detector characteristic, pixel values of the raw-format prior mammographic image are remapped (see block 902, $RAW_{P,204} \rightarrow RAW'_{P,205}$) to estimate pixel values that would have resulted from acquiring the raw-format prior mammographic image from the second digital mammogram acquisition system. This remapping is can be based on known or empirically determined characteristics of the detectors. For the empirical determination case, the remapping is determined in a relatively straightforward manner based upon the results in raw format of imaging a calibration phantom with each of the first and second digital mammogram acquisition systems.

Further with reference to FIG. 9, the remapped (or non-remapped if the detector characteristics were identical) raw-format prior mammographic image is then display-enhanced (see block 904) according to one of an actual display enhancement algorithm $ALG_{205}$ and emulative display enhancement algorithm $EMU\_ALG_{205}$ associated with the second digital mammogram acquisition system 205. Then displayed for simultaneous viewing on a display 906 are the display enhanced remapped (or non-remapped) raw-format prior mammographic image in display window 906*a* and the display-enhanced version DISPLAY-ENHANCED$_{205}$ in display window 906*b* of the subsequent mammographic image processed according to the actual enhancement algorithm $ALG_{205}$ associated with the second digital acquisition system 205. Comparison between the prior and subsequent mammographic images is facilitated because, to an appealingly precise degree, both the prior and subsequent mammograms appear as if they were both acquired using the second mammogram acquisition system 205.

For a preferred embodiment in which the actual algorithm $ALG_{205}$ is used, the actual display enhancement algorithm might be obtained directly from the acquisition system manufacturer by virtue of system documentation or other public information, or by license agreement or partnership/merger if the display enhancement algorithm is proprietary. However, if the actual algorithm cannot be obtained directly, then in another embodiment an emulative display enhancement algorithm $EMU\_ALG_{205}$ is heuristically determined by analysis of raw and display-enhanced versions of a plurality of test mammogram views acquired using the second digital mammogram acquisition system 205.

For one preferred embodiment, the heuristic determination comprises visually comparing the raw and display-enhanced versions of the mammogram views, identifying at least one basis enhancement algorithm believed likely to produce results visually similar to the display-enhanced versions when applied to the raw versions. The empirical determinations used to identify the basis functions can be made by a skilled image processing specialist as may be employed by a medical imaging software or hardware provider, a university professor, etc. Such person would use test phantoms having certain shapes or other characteristics known to be able to test for the presence of certain algorithm functionality. By way of example, a ring-shaped washer with a small central hole can betray the presence of neighborhood-based filtering algorithms if the processed image has higher values inside the hole of the washer. Certain outputs from calibration step wedges, such as wavelike spatially varying amplitudes near the wedge steps in the processed images, can betray the likely use of a contrast limited adaptive histogram equalization (CLAHE) algorithm. However, to determine a suitable emulative enhancement algorithm, it is not always necessary to be exact in the identification of the precise actual display enhancement processes used, provided sufficiently close emulation can otherwise be achieved.

The plurality of basis enhancement algorithms can include, for example, a peripheral enhancement algorithm (commonly known to be used in mammography display enhancement algorithms to emphasize tissue near the skinline have lesser raw intensity because of lesser between-plate tissue) having a rolloff intensity weighting factor, a contrast enhancement algorithm, and a windowing and leveling algorithm. Other examples of basis enhancement algorithms include, but are not limited to, multiscale wavelet filtering algorithms, proprietary enhancement algorithms that may be available under license, or known public domain enhancement algorithms.

The contrast enhancement algorithm can include, for example, a contrast limited adaptive histogram equalization (CLAHE) algorithm having an associated parameter set including a contextual regions parameter and a clip level parameter, and/or can also include, for example, an adaptive unsharp mask filtering algorithm having an associated parameter set including a filter size and a high-pass weighting factor. For one embodiment, the high-pass weighting factor of the adaptive unsharp mask filtering algorithm is increased near line edges and small spots such as microcalcifications as may be determined by segmentation and/or various line or spot-enhancing filters.

Preferably, the heuristic determination further comprises iteratively optimizing a parameter set associated with each of the at least one basis enhancement algorithms by visual examination of intermediate results generated by applying the basis enhancement algorithm to at least one test image under induced variations of the parameter set. The emulative display enhancement algorithm is then identified as a serial application of a plurality of the basis enhancement algorithms using their associated respective optimized parameter sets.

With reference to FIG. 10, according to another preferred embodiment, a method for facilitating temporal comparison of digitally acquired breast mammograms by a viewer is provided, comprising receiving a prior mammographic image ($RAW_{P,204}$ or DISPLAY-ENHANCED$_{P,204}$) originating from a first digital mammogram acquisition system 204, and receiving in a raw format a subsequent mammographic image $RAW_{S,205}$ of the breast originating from a second digital mammogram acquisition system 205 different than the first digital mammogram acquisition system with respect to at least one of system manufacturer, detector characteristic, and display enhancement algorithm. If the first and second digital mammogram acquisition systems 204 and 205 differ with respect to the detector characteristic, pixel values of the raw-format subsequent mammographic image are remapped (see block 1003, $RAW_{S,205} \rightarrow RAW'_{P,204}$) to estimate pixel values that would have resulted from acquiring the raw-format subsequent mammographic image using the first digital mammogram acquisition system 204.

The remapped (or non-remapped) raw-format subsequent mammographic image is then display-enhanced (see block 1004) according to one of an actual display enhancement algorithm $ALG_{204}$ and emulative display enhancement algorithm $EMU\_ALG_{204}$ associated with the first digital mammogram acquisition system 204. Then displayed at the display 906 for simultaneous viewing are the display enhanced remapped (or non-remapped) raw-format subsequent mammographic image at display window 1006a and a display-enhanced version of the prior mammographic image, which itself can be the result of one of (i) direct retrieval of DISPLAY-ENHANCED$_{P,204}$ from a storage database, (ii) display-enhancing the raw-format prior mammographic image $RAW_{P,204}$ according to an actual display enhancement algorithm $ALG_{204}$ associated with the first digital mammogram acquisition system 204, and (iii) display-enhancing the raw-format prior mammographic image $RAW_{P,204}$ according to an emulative display enhancement algorithm $EMU\_RAW_{P,204}$ associated with the first digital mammogram acquisition system 204. Comparison between the prior and subsequent mammographic images is facilitated because, to an appealingly precise degree, both the prior and subsequent mammograms appear as if they were both acquired using the first mammogram acquisition system 204. For one preferred embodiment, the viewer (and/or their institution at installation or setup time) is provided a choice between the scenarios of FIGS. 9 and 10, i.e., a choice as to whether both of the mammograms appear to have been from the first mammogram acquisition system (FIG. 10) or whether both appear to have been from the second mammogram acquisition system (FIG. 9).

In accordance with one or more advantages according to the preferred embodiments, there is provided at least one of (i) a timewise dimension, and (ii) a visual spatial dimension for prompt comparative viewing of multiple CAD detections in a case. Additionally, there is concurrently provided a prompt comparison of the multiple CAD detections with a reference database of known cases. An advantageous combination of quickness and richness of analysis is provided that promotes one or more of faster patient throughput, viewer stamina, reduced per-patient cost, and increased quality of review.

In a review workstation for the display of digital mammographic images, comparison of temporal changes in breast tissue is facilitated by adjacently displaying two digital images of the breast that were taken at different times and on different digital mammographic acquisition equipment, wherein the two digital images are displayed at an identical absolute spatial resolution (e.g., tissue distance per monitor-pixel) according to known physical parameters of the different digital mammographic acquisition equipment. By way of example, a first digital image may have been acquired by a first FFDM detector at 54 microns per detector-pixel, while a second digital image may have been acquired by a second FFDM detector at 100 microns per detector-pixel. According to a preferred embodiment, the two digital images are automatically scaled such that they both display the same absolute spatial resolution, that is, the first and second digital images both show the same number "X" microns of breast tissue per monitor-pixel (or the same number "Y" of cm of breast tissue per monitor-cm, etc.)

While there may be prior art algorithms for "spatial registration" of mammograms for temporal comparison, known algorithms generally assume that the breast has stayed the same absolute size, and then they focus on image-specific aspects of breast registration. However, the present invention takes into account the fact that the overall size of the breast may change substantially, even over short periods of time, due to weight changes, hydration, breast compression by the mammographic acquisition device, and other factors. Accordingly, it has been found most desirable to acquire the physical parameters of the FFDM detectors from the DICOM header associated with each image, leading to knowledge of tissue distance per detector-pixel, and then display the two images at the same absolute spatial resolution (tissue distance per monitor-pixel or monitor-cm), such that, for example, 3 cm on the first image display unquestionably has the same physical meaning as 3 cm on the second image display.

A temporal comparison display consistent with the scale-matching aspects of the present invention as described in Ser. No. 60/736,510, supra, was first disclosed to the public by assignee R2 Technology, Inc. on Nov. 28, 2004 at the Radiological Society of North America (RSNA) conference in Chicago, Ill. The feature was enthusiastically received as resolving a long-felt need to streamline the initial temporal comparison display for digital mammograms, the radiologists being delighted with the combination of (i) the convenience of instantaneously viewing scale-matched "old" and "new" images such that tissue sizes could be compared right away without laboriously needing to view/adjust the scaling information on the images, and (ii) the assurance that the scale matching was physically absolute (in distinction to image-based "spatial registrations" that presume the breast has stayed the same size.)

Preferably, auto-cropping/auto-windowing is also performed such that the two images show at least roughly the same overall window of the breast tissue. Although the scope of the preferred embodiments is not necessarily so limited, the effectiveness of the absolutely-scale-matched presentation is most apparent when the side-by-side, absolute spatial resolution matched images are the first default view encountered during the temporal comparison process. The effectiveness is even further enhanced when the radiologist is "flashed" with an unprocessed version of the first and/or second digital images for about 0.5-1.0 seconds, and then shown the absolute-spatial-resolution-matched images. This is because the radiologist can have a very quick appreciation of the absolute scale matching that the display system has done on their behalf.

Whereas many alterations and modifications of the present invention will no doubt become apparent to a person of ordinary skill in the art after having read the foregoing description, it is to be understood that the particular embodiments shown and described by way of illustration are in no way intended to be considered limiting. By way of example, in another preferred embodiment, comparison of temporal changes in breast tissue is facilitated by adjacently displaying two digital images of the breast that were taken at different times, one of them having been taken on digital mammographic acquisition equipment, and the other being a digitized version of a film mammogram acquired on a film-screen mammographic system, wherein the two digital images are displayed at an identical absolute spatial resolution (e.g., tissue distance per monitor-pixel) according to known parameters of the digital mammographic acquisition equipment, the film-screen mammographic system, and the film digitization equipment.

In yet another preferred embodiment, comparison of temporal changes in breast tissue is facilitated by adjacently displaying two digital images of the breast that were taken at different times, both of them being digitized versions of film mammograms acquired on film-screen mammographic systems, wherein the two digital images are displayed at an identical absolute spatial resolution (e.g., tissue distance per monitor-pixel) according to known parameters of their associated film-screen mammographic system(s) and/or the film digitization equipment.

By way of further example, in addition to side-by-side comparison, which can upper-lower placement of display windows, lateral side-by-side display windows, and generally any spatially adjacent display windows, in one or more preferred embodiments simultaneous display can also refer to layered viewing, with one display window (for example, current-year RMLO) superimposed as a layer upon another display window (for example, prior-year RMLO) in which the viewer can selectively peek behind the upper layer to the lower layer for an area of interest, as described further in the commonly assigned U.S. Ser. No. 11/323,939, filed Dec. 29, 2005, which is incorporated by reference herein. Therefore, reference to the details of the preferred embodiments are not intended to limit their scope, which is limited only by the scope of the claims set forth below.

What is claimed is:

1. A method for facilitating temporal comparison of breast mammograms by a viewer, comprising:
receiving a prior mammographic image originating from a first mammogram acquisition system and having a first tissue distance per pixel, and further receiving a prior mammogram image set comprising a plurality of mammogram views of the breast, said prior mammographic image being one of said plurality of mammogram views;
receiving a subsequent mammographic image of the breast originating from a second mammogram acquisition system different than the first mammogram acquisition system and having a second tissue distance per pixel different than the first tissue distance per pixel, and further receiving a subsequent mammogram image set comprising a corresponding plurality of mammogram views of the breast, said subsequent mammographic image being one of said corresponding plurality of mammogram views; and
without requiring a scale-adjusting viewer input, displaying for simultaneous viewing all of said mammogram views of both of said prior and subsequent mammogram image sets including said prior and subsequent mammographic images on a same mammogram display at an identical tissue distance per unit display distance, said simultaneously displayed mammogram views appearing in a respective plurality of display windows sized according to a hanging protocol, the method further comprising segmenting each of said mammogram views of said subsequent mammogram image set to identify a background section and a breast tissue section thereof, wherein said identical tissue distance per unit display distance is a value for which both (i) a relatively large percentage of at least one of the display windows associated with said subsequent mammogram image set is occupied by the breast tissue section of the corresponding mammogram view, and (ii) the breast tissue sections of each of the simultaneously displayed mammogram views for said subsequent mammogram image set are wholly contained in their respective display windows.

2. The method of claim 1, wherein said first and second mammogram acquisition systems are different with respect to at least one of system manufacturer, detector type, detector size, and detector resolution.

3. The method of claim 2, wherein at least one of said first and second mammogram acquisition systems are film-screen systems, and wherein said detector resolution corresponds to a film size and digitizer resolution for the at least one film-screen system.

4. The method of claim 2, wherein each of said first and second mammogram acquisition systems are digital acquisition systems, the method further comprising:
for each of said prior and subsequent mammographic images, receiving a DICOM header associated therewith; and
determining said first and second tissue distances per unit pixel based on said received DICOM headers.

5. The method of claim 1, wherein said value for said identical tissue distance per unit display distance is further characterized in that both (i) the breast tissue section of one of said mammogram views associated with said subsequent mammogram image set extends across a predetermined high percentage of its display window in one of a heightwise and widthwise dimension and extends across less than said predetermined high percentage in the other of the heightwise and widthwise dimensions, and (ii) the breast tissue sections of each of the other mammogram views associated with said subsequent mammogram image set extends across less than said predetermined high percentage for both the heightwise and widthwise dimensions.

6. The method of claim 5, wherein said plurality of display windows are identically sized according to one of a 2-up, 4-up, or 8-up hanging protocol.

7. The method of claim 5, wherein said predetermined high percentage is about 95%.

8. A method for facilitating temporal comparison of breast mammograms by a viewer, comprising:
receiving a prior mammographic image originating from a first mammogram acquisition system and having a first tissue distance per pixel, and further receiving a prior mammogram image set comprising a plurality of mammogram views of the breast, said prior mammographic image being one of said plurality of mammogram views;
receiving a subsequent mammographic image of the breast originating from a second mammogram acquisition system different than the first mammogram acquisition system and having a second tissue distance per pixel different than the first tissue distance per pixel, and further receiving a subsequent mammogram image set comprising a corresponding plurality of mammogram views of the breast, said subsequent mammographic image being one of said corresponding plurality of mammogram views; and without requiring a scale-adjusting viewer input, displaying for simultaneous viewing all of said mammogram views of both of said prior and subsequent mammogram image sets including said prior and subsequent mammographic images on a same mammogram display at an identical tissue distance per unit display distance, said simultaneously displayed mammogram views appearing in a respective plurality of display windows sized according to a hanging protocol, the method further comprising segmenting each of said mammogram views to identify a background section and a breast tissue section thereof, wherein said identical tissue distance per unit display distance is a value for which both (i) a relatively large percentage of at least one of the display windows is occupied by the breast tissue section of the corresponding mammogram view, and (ii) the breast tissue sections of each of the simultaneously displayed mammogram views are wholly contained in their respective display windows.

9. The method of claim 8, wherein said value for said identical tissue distance per unit display distance is further characterized in that both (i) the breast tissue section of one of said mammogram views extends across a predetermined high percentage of its display window in one of a heightwise and widthwise dimension and extends across less than said predetermined high percentage in the other of the heightwise and widthwise dimensions, and (ii) the breast tissue sections of each of the other mammogram views extends across less than said predetermined high percentage for both the heightwise and widthwise dimensions.

10. The method of claim 9, wherein said plurality of display windows are identically sized according to one of a 2-up, 4-up, or 8-up hanging protocol.

11. The method of claim 9, wherein said predetermined high percentage is about 95%.

12. A method for facilitating temporal comparison of breast mammograms by a viewer, comprising:

receiving a prior mammographic image originating from a first mammogram acquisition system and having a first tissue distance per pixel, and further receiving a prior mammogram image set comprising a plurality of mammogram views of the breast, said prior mammographic image being one of said plurality of mammogram views;

receiving a subsequent mammographic image of the breast originating from a second mammogram acquisition system different than the first mammogram acquisition system and having a second tissue distance per pixel different than the first tissue distance per pixel, and further receiving a subsequent mammogram image set comprising a corresponding plurality of mammogram views of the breast, said subsequent mammographic image being one of said corresponding plurality of mammogram views; and without requiring a scale-adjusting viewer input, displaying for simultaneous viewing all of said mammogram views of both of said prior and subsequent mammogram image sets including said prior and subsequent mammographic images on a same mammogram display at an identical tissue distance per unit display distance, said simultaneously displayed mammogram views appearing in a respective plurality of display windows sized according to a hanging protocol and being paired according to said hanging protocol, the method further comprising:

segmenting each of said mammogram views to identify a background section and a breast tissue section thereof; and processing said segmented breast tissue section of each of said mammogram views to identify a fiducial alignment marker location thereon;

wherein paired ones of said displayed mammogram views are displayed horizontally adjacent to each other and are vertically aligned on said mammogram display according to said identified fiducial marker locations.

13. The method of claim 12, wherein said fiducial alignment marker locations are computed to correspond to one of a breast tissue centroid location, a nipple location, and a halfway point between an uppermost and lowermost point of the segmented breast tissue.

14. The method of claim 1, said first and second mammogram acquisition systems being digital mammography systems and differing with respect to detector characteristic and display enhancement algorithm, said prior mammographic image being received in a raw format, wherein the method further comprises:

remapping pixel values of the raw-format prior mammographic image to estimate pixel values that would have resulted from acquiring said raw-format prior mammographic image using said second mammogram acquisition system; and display-enhancing said remapped raw-format prior mammographic image according to one of an actual display enhancement algorithm and emulative display enhancement algorithm associated with said second mammogram acquisition system;

wherein said displaying for simultaneous viewing comprises displaying (i) said display enhanced remapped raw-format prior mammographic image and (ii) a display-enhanced version of said subsequent mammographic image processed according to the actual enhancement algorithm associated with said second digital acquisition system, whereby comparison between said prior and subsequent mammographic images is facilitated.

15. The method of claim 14, wherein said emulative display enhancement algorithm is heuristically determined by analysis of raw and display-enhanced versions of a plurality of test mammogram views acquired using said second mammogram acquisition system.

16. The method of claim 15, wherein said heuristically determining comprises:

visually comparing said raw and display-enhanced versions of said plurality of test mammogram views;

identifying at least one basis enhancement algorithm believed likely to produce results visually similar to said display-enhanced versions when applied to said raw versions; and iteratively optimizing a parameter set associated with each of said at least one basis enhancement algorithms by visual examination of intermediate results generated by applying said basis enhancement algorithm to at least one test image under induced variations of said parameter set.

17. The method of claim 16, further comprising identifying said emulative display enhancement algorithm as a serial application of a plurality of said basis enhancement algorithms using their associated respective optimized parameter sets, wherein said plurality of said basis enhancement algorithms includes a peripheral enhancement algorithm, a contrast enhancement algorithm, and a windowing and leveling algorithm.

18. The method of claim 17, wherein said contrast enhancement algorithm includes one of (i) a contrast limited adaptive histogram equalization (CLAHE) algorithm having an associated parameter set including a contextual regions parameter and a clip level parameter, and (ii) an adaptive unsharp mask filtering algorithm having an associated parameter set including a filter size and a high-pass weighting factor.

19. The method of claim 14, wherein said remapping pixel values is based upon the results in raw format of imaging a calibration phantom with each of said first and second mammogram acquisition systems.

20. The method of claim 1, said first and second mammogram acquisition systems being digital mammography systems and differing with respect to detector characteristic and display enhancement algorithm, said subsequent mammographic image being received in a raw format, wherein the method further comprises:

remapping pixel values of the raw-format subsequent mammographic image to estimate pixel values that would have resulted from acquiring said raw-format subsequent mammographic image using said first mammogram acquisition system; and display-enhancing said remapped raw-format subsequent mammographic image according to one of an actual display enhancement algorithm and emulative display enhancement algorithm associated with said first mammogram acquisition system;

wherein said displaying for simultaneous viewing comprises displaying (i) said display enhanced remapped raw-format subsequent mammographic image and (ii) a display-enhanced version of said prior mammographic image.

21. The method of claim 20, wherein said display-enhanced version of said prior mammographic image results from one of (i) direct retrieval from a storage database, (ii) display-enhancing a raw-format prior mammographic image according to an actual display enhancement algorithm associated with said first mammogram acquisition system, and (iii) display-enhancing the raw-format prior mammographic image according to an emulative display enhancement algorithm associated with said first mammogram acquisition system 22. The method of claim 20, wherein said emulative display enhancement algorithm is heuristically determined by analysis of raw and display-enhanced versions of a plurality of test mammogram views acquired using said first mammogram acquisition system.

23. A computer program product stored on a tangible non-transitory computer readable medium for facilitating temporal comparison of breast mammograms by a viewer, comprising:

computer code for receiving a first mammographic image of a breast originating from a first mammogram acquisition system and a temporally distinct second mammographic image of the breast originating from a second mammogram acquisition system different than the first mammogram acquisition system with respect to at least one of system manufacturer, detector type, detector size, and detector resolution;

computer code for segmenting each of said first and second mammographic images to identify a background section and a breast tissue section thereof; and computer code for simultaneously displaying, without requiring a scale-adjusting or a window-adjusting viewer input, said first and second mammographic images at a same absolute spatial scale in commonly sized, substantially adjacent display windows on a mammogram display;

wherein said same absolute spatial scale is a value for which (i) the breast tissue section of one of said first and second mammographic images extends across a predetermined high percentage of its display window in one of a heightwise and widthwise dimension and extends across less than said predetermined high percentage in the other of the heightwise and widthwise dimensions, and (ii) the breast tissue section of the other mammographic image extends across less than said predetermined high percentage for both the heightwise and widthwise dimensions.

24. The method of claim 23, wherein said predetermined high percentage is about 95%.

25. The computer program product of claim 23, wherein at least one of said first and second mammogram acquisition systems are film-screen systems, and wherein said detector resolution corresponds to a digitizer resolution for the at least one film-screen system.

26. The computer program product of claim 23, wherein each of said first and second mammogram acquisition systems are digital acquisition systems identified by a DICOM header associated with each of said first and second mammographic images.

27. The computer program product of claim 23, said first and second mammogram acquisition systems being digital mammography systems, said first mammographic image being received in a raw format, the computer program product further comprising:

computer code for remapping pixel values of the raw-format first mammographic image to estimate pixel values that would have resulted from acquiring said raw-format first mammographic image from said second mammogram acquisition system; and computer code for display-enhancing said remapped raw-format first mammographic image according to one of an actual display enhancement algorithm and emulative display enhancement algorithm associated with said second mammogram acquisition system;

wherein said computer code for displaying for simultaneous viewing comprises computer code for displaying (i) said display enhanced remapped raw-format first mammographic image, and (ii) a display-enhanced version of said second mammographic image processed according to a display enhancement algorithm associated with said second digital acquisition system, whereby comparison between said first and second mammographic images is facilitated.

28. The computer program product of claim 27, wherein said emulative display enhancement algorithm is a result of heuristic determination by analysis of raw and display-enhanced versions of a plurality of test mammogram views acquired using said second mammogram acquisition system.

29. The computer program product of claim 28, wherein said heuristic determination comprises:

visually comparing said raw and display-enhanced versions of said plurality of test mammogram views;

identifying at least one basis enhancement algorithm believed likely to produce results visually similar to said display-enhanced versions when applied to said raw versions; and iteratively optimizing a parameter set associated with each of said at least one basis enhancement algorithms by visual examination of intermediate results generated by applying said basis enhancement algorithm to at least one test image under induced variations of said parameter set.

30. The computer program product of claim 29, wherein said heuristic determination further comprises identifying said emulative display enhancement algorithm as a serial application of a plurality of said basis enhancement algorithms using their associated respective optimized parameter sets, wherein said plurality of said basis enhancement algorithms includes a peripheral enhancement algorithm, a contrast enhancement algorithm, and a windowing and leveling algorithm.

31. A method for facilitating temporal comparison of digitally acquired breast mammograms by a viewer, comprising:
receiving a prior mammographic image originating from a first digital mammogram acquisition system in a raw format;
receiving a subsequent mammographic image of the breast originating from a second digital mammogram acquisition system different than the first digital mammogram acquisition system with respect to detector characteristic and display enhancement algorithm;
remapping pixel values of the raw-format prior mammographic image to estimate pixel values that would have resulted from acquiring said raw-format prior mammographic image from said second digital mammogram acquisition system;
display-enhancing said remapped raw-format prior mammographic image according to one of an actual display enhancement algorithm and emulative display enhancement algorithm associated with said second digital mammogram acquisition system; and
displaying for simultaneous viewing said display enhanced remapped raw-format prior mammographic image and a display-enhanced version of said subsequent mammographic image processed according to the actual enhancement algorithm associated with said second digital acquisition system, whereby comparison between said prior and subsequent mammographic images is facilitated.

32. The method of claim 31, wherein said emulative display enhancement algorithm is heuristically determined by analysis of raw and display-enhanced versions of a plurality of test mammogram views acquired using said second digital mammogram acquisition system.

33. The method of claim 32, wherein said heuristically determining comprises:
visually comparing said raw and display-enhanced versions of said plurality of test mammogram views;
identifying at least one basis enhancement algorithm believed likely to produce results visually similar to said display-enhanced versions when applied to said raw versions; and
iteratively optimizing a parameter set associated with each of said at least one basis enhancement algorithms by visual examination of intermediate results generated by applying said basis enhancement algorithm to at least one test image under induced variations of said parameter set.

34. The method of claim 33, further comprising identifying said emulative display enhancement algorithm as a serial application of a plurality of said basis enhancement algorithms using their associated respective optimized parameter sets, wherein said plurality of said basis enhancement algorithms includes a peripheral enhancement algorithm, a contrast enhancement algorithm, and a windowing and leveling algorithm.

35. The method of claim 34, wherein said contrast enhancement algorithm includes one of (i) a contrast limited adaptive histogram equalization (CLAHE) algorithm having an associated parameter set including a contextual regions parameter and a clip level parameter, and (ii) an adaptive unsharp mask filtering algorithm having an associated parameter set including a filter size and a high-pass weighting factor.

36. The method of claim 31, wherein said remapping pixel values is based upon the results in raw format of imaging a calibration phantom with each of said first and second digital mammogram acquisition systems.

37. A method for facilitating temporal comparison of digitally acquired breast mammograms by a viewer, comprising:
receiving a prior mammographic image originating from a first digital mammogram acquisition system;
receiving in a raw format a subsequent mammographic image of the breast originating from a second digital mammogram acquisition system different than the first digital mammogram acquisition system with respect to detector characteristic and display enhancement algorithm;
remapping pixel values of the raw-format subsequent mammographic image to estimate pixel values that would have resulted from acquiring said raw-format subsequent mammographic image using said first digital mammogram acquisition system; and
display-enhancing said remapped raw-format subsequent mammographic image according to one of an actual display enhancement algorithm and emulative display enhancement algorithm associated with said first digital mammogram acquisition system; and
displaying for simultaneous viewing (i) said display enhanced remapped raw-format subsequent mammographic image and (ii) a display-enhanced version of said prior mammographic image.

38. The method of claim 37, wherein said display-enhanced version of said prior mammographic image results from one of (i) direct retrieval from a storage database, (ii) display-enhancing a raw-format prior mammographic image according to an actual display enhancement algorithm associated with said first digital mammogram acquisition system, and (iii) display-enhancing the raw-format prior mammographic image according to an emulative display enhancement algorithm associated with said first digital mammogram acquisition system.

39. The method of claim 37, wherein said emulative display enhancement algorithm is heuristically determined by analysis of raw and display-enhanced versions of a plurality of test mammogram views acquired using said first digital mammogram acquisition system.

40. The method of claim 39, wherein said heuristically determining comprises:
visually comparing said raw and display-enhanced versions of said plurality of test mammogram views;
identifying at least one basis enhancement algorithm believed likely to produce results visually similar to said display-enhanced versions when applied to said raw versions; and
iteratively optimizing a parameter set associated with each of said at least one basis enhancement algorithms by visual examination of intermediate results generated by applying said basis enhancement algorithm to at least one test image under induced variations of said parameter set.

41. The method of claim 40, further comprising identifying said emulative display enhancement algorithm as a serial application of a plurality of said basis enhancement algorithms using their associated respective optimized parameter sets, wherein said plurality of said basis enhancement algorithms includes a peripheral enhancement algorithm, a contrast enhancement algorithm, and a windowing and leveling algorithm.

42. The method of claim 41, wherein said contrast enhancement algorithm includes one of (i) a contrast limited adaptive histogram equalization (CLAHE) algorithm having an associated parameter set including a contextual regions parameter and a clip level parameter, and (ii) an adaptive unsharp mask filtering algorithm having an associated parameter set including a filter size and a high-pass weighting factor.

* * * * *